No. 790,896. PATENTED MAY 30, 1905.
A. W. HERBERT & F. N. GIBBS.
AUTOMATIC DISPLAY APPARATUS.
APPLICATION FILED JULY 29, 1904.
2 SHEETS—SHEET 2.
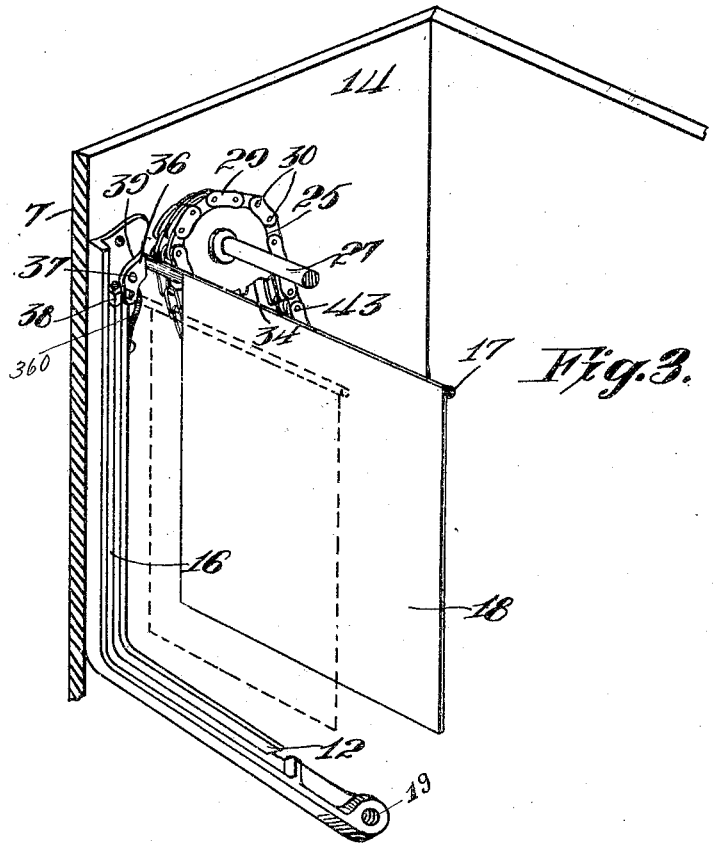
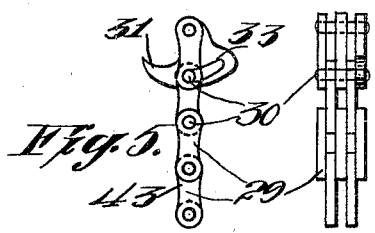
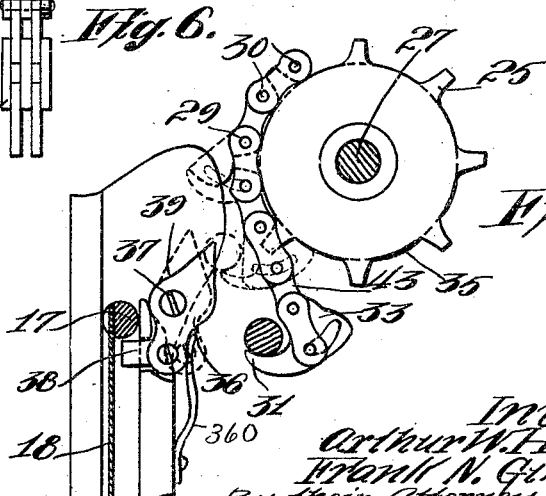

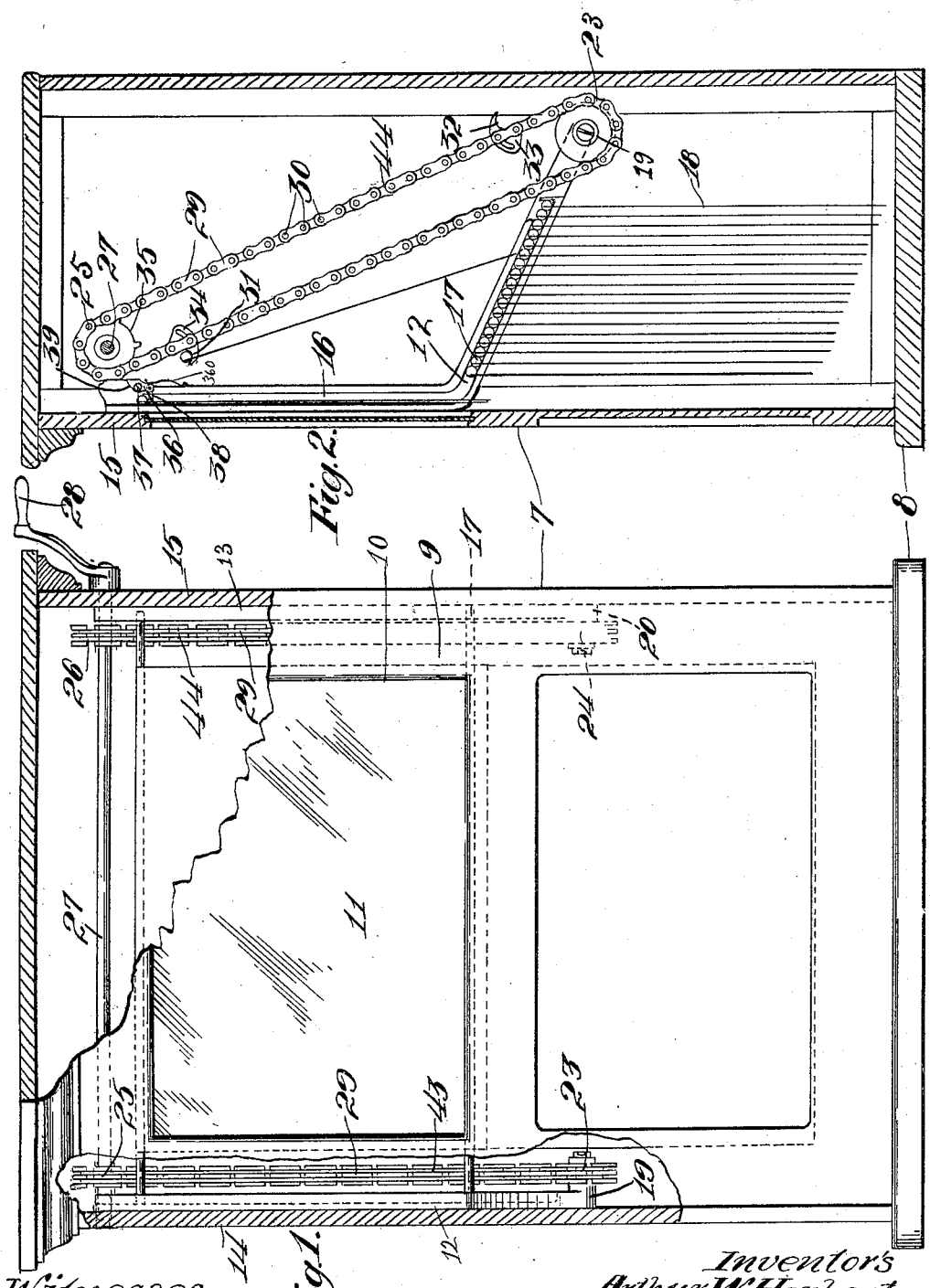

No. 790,896. Patented May 30, 1905.

UNITED STATES PATENT OFFICE.

ARTHUR W. HERBERT AND FRANK N. GIBBS, OF NEW YORK, N. Y.

AUTOMATIC DISPLAY APPARATUS.

SPECIFICATION forming part of Letters Patent No. 790,896, dated May 30, 1905.

Application filed July 29, 1904. Serial No. 218,664.

*To all whom it may concern:*

Be it known that we, ARTHUR W. HERBERT and FRANK N. GIBBS, citizens of the United States, residing at New York city, in the county of New York and State of New York, have invented certain new and useful Improvements in Automatic Display Apparatus, of which the following is a specification.

This invention comprehends the provision of means whereby a variety of subjects may be intermittently displayed automatically and may be embodied, if desirable, in devices employed for general advertising, in devices for indicating signals, and in devices for indicating the time of departure as well as the various destinations of trains.

For convenience of illustration and explanation an embodiment of the invention is set forth on the accompanying sheets of drawings, which illustrate a cabinet provided with a plurality of signs, and whereon—

Figure 1 illustrates an elevational view, partly broken away, of such cabinet. Fig. 2 illustrates a transverse sectional view of the same. Fig. 3 illustrates a perspective view giving certain details of the construction. Fig. 4 illustrates a detail of the construction. Fig. 5 is a side view of the fragment of chain, and Fig. 6 is an edge view thereof.

In the various figures similar characters of reference are applied to similar parts.

In the form shown the cabinet 7, mounted on the base 8, is provided on its front side 9 with an opening 10, wherein in the present instance is mounted a glass 11. Mounted within the casing are a pair of racks 12 and 13, respectively, which are preferably located on each side, as 14 and 15, of the casing, and the upward extended portions 16 of which racks are preferably located just beyond the opening 10 of the front 9, and adapted to travel in said racks are a series of horizontally-disposed rods 17, each of which may be provided with any suitable sign, picture, or other subject 18, which may be preferably of a size suitable to conform to the size of the opening 10 or the glass 11.

Mounted in suitable bearings 19 and 20, respectively, are sprocket-wheels 23 and 24, respectively, each corresponding to sprocket-wheels 25 and 26, which are mounted on a longitudinal shaft 27, adapted to be actuated in any suitable manner, (a handle 28 on the outside of the casing being herein shown.)

In the present instance the chains 43 and 44 are formed in the usual manner by having links 29 suitably coupled together by pins 30. This chain, however, in the present instance is at certain points throughout its length provided with projecting portions or intercepters 31 and 32—such, for instance, as hooks—and oscillating links 33 and 34, adapted to be actuated as such links come into contact with the inner periphery 35 of the sprocket-wheels. These hooks in the present instance are adapted upon an upward travel of the chain to engage with the extremities of one of the rods 17, which extremities in the present instance extend into the racks 12 and 13, respectively, so that such rods and the matter carried thereby will be conveyed upward to a point where they meet members 36, pivoted at 37, and each of which has a tooth 38 extending into the groove in the racks 12 and 13 and which hold in place the rod 17, which has been previously directed into said rack. Upon further movement of the chains the rod carried thereby will press against the member 36 and withdraw a tooth 38, so that the rod 17 in the racks may drop, and simultaneously with such operation the oscillating links 33 will be pressed forward by engaging with the periphery 35 of the sprocket-wheel, whereby the next succeeding rod now borne in the hooks will be urged forward until it rolls over the edge 39 of the member 36, and hence drops into place in the manner shown in Fig. 4, it being understood that the member 36 will by this time have returned to its normal position by a spring 360, suitably disposed so that the tooth 38 will be extended into the racks, so as to catch the rod just directed into such racks.

It will now be understood that upon the continuous rotation of the chains, which may be accomplished in any suitable manner—as, for instance, by the handle 28—the various signs will be lifted in succession to a displaying position and likewise allowed to drop out of such place and slide down the racks behind others which are ready to be lifted up.

That which is herein illustrated and described, as has been before stated, constitutes an embodiment of this invention, and without departing from the spirit thereof we may resort to other modifications and constructions and even modify the construction and arrangement of the parts of the device herein shown.

It will now be noted that we have provided a simple device, which may be operated by hand or power, whereby various signs, pictures, or other subjects may be automatically placed in position for inspection for a limited period (if the apparatus is to be run continuously) or for any length of time desired.

Having thus described our invention, we claim—

1. In a display apparatus, the combination with a casing having a window, of a series of display-cards adapted to be displayed therefrom, rods carried by each display-card, a plurality of racks in which said rods may travel, a reciprocating tooth in each rack at its upper end for holding a rod in position, sprocket-wheels located in said cabinet, a chain traveling over said sprocket-wheels, means carried thereby for elevating one rod at a time to a displaying position, means also carried by said chain for discharging a rod therefrom, and means to release the tooth so that the rod may descend.

2. An elevating-chain having a link provided with a projection, and a link lying alongside of said link and adapted to be oscillated to and from said projection while passing over the sprocket-wheel.

3. An elevating apparatus comprising a pair of sprocket-wheels, a chain passing thereover, said chain having a link provided with a tooth to be forced outward by the wheel so as to remove that which may be carried by the tooth.

4. An elevating-chain having a link provided with an intercepter and a second link lying alongside said first link adapted to be oscillated to and from said intercepter, whereby to force that which may be carried by said intercepter therefrom.

5. An elevating apparatus comprising a pair of sprocket-wheels, means for operating one of said wheels, a chain passing over said wheels, said chain having a link provided with a tooth, and another link adapted to be forced outward by the wheel so as to remove that which may be carried by the tooth.

Signed at Nos. 9 to 15 Murray street, New York city, New York, this 23d day of July, 1904.

ARTHUR W. HERBERT.
FRANK N. GIBBS.

Witnesses:
FRED. W. BARNACLO,
CHAS. LYON RUSSELL.